United States Patent
Nadler et al.

(10) Patent No.: US 11,554,429 B2
(45) Date of Patent: Jan. 17, 2023

(54) IN LINE EDGE-SEALING SYSTEM AND METHOD

(71) Applicant: ROYAL GROUP, INC., Atlanta, GA (US)

(72) Inventors: Brandon Sevier Nadler, Abingdon, VA (US); Patrick Henry Izzo, Abingdon, VA (US); Rodney Lee Olinger, Saltville, VA (US)

(73) Assignee: ROYAL GROUP, INC., Atlanta, GA (US)

( * ) Notice: Subject to any disclaimer, the term of this patent is extended or adjusted under 35 U.S.C. 154(b) by 315 days.

(21) Appl. No.: 16/276,693

(22) Filed: Feb. 15, 2019

(65) Prior Publication Data

US 2019/0248047 A1 Aug. 15, 2019

Related U.S. Application Data

(60) Provisional application No. 62/630,869, filed on Feb. 15, 2018.

(51) Int. Cl.
| | |
|---|---|
| *B23D 45/10* | (2006.01) |
| *B29C 35/02* | (2006.01) |
| *B23D 61/02* | (2006.01) |
| *B29C 69/00* | (2006.01) |
| *B29C 67/20* | (2006.01) |
| *B29C 67/00* | (2017.01) |
| *B32B 43/00* | (2006.01) |

(52) U.S. Cl.
CPC ........... *B23D 45/10* (2013.01); *B23D 61/025* (2013.01); *B29C 35/0255* (2013.01); *B29C 67/004* (2013.01); *B29C 67/20* (2013.01); *B29C 69/001* (2013.01); *B32B 43/003* (2013.01); *B32B 2327/06* (2013.01)

(58) Field of Classification Search
CPC ............. Y10T 83/9324; Y10T 83/2077; B29C 35/0255; B29C 67/004; B29C 67/20; B29C 69/001; B23D 61/025; B23D 45/26; B32B 43/003; B32B 2327/06; B27B 5/06; B27B 5/063; B27B 5/08; B27B 7/04; B27B 33/04; B27B 33/08
See application file for complete search history.

(56) References Cited

U.S. PATENT DOCUMENTS

| | | | | |
|---|---|---|---|---|
| 1,861,218 | A * | 5/1932 | Huther ................. | B23D 61/025 83/835 |
| 2,913,025 | A * | 11/1959 | Richards .............. | B23D 45/067 144/1.1 |
| 3,042,088 | A * | 7/1962 | Filion .................... | B27G 19/08 30/383 |

(Continued)

*Primary Examiner* — Phong H Nguyen
(74) *Attorney, Agent, or Firm* — Polsinelli PC

(57) ABSTRACT

An inline edge-sealing apparatus and method for sealing the kerf surfaces of cut cellular PVC board includes a rotary saw with either a tandem sealing disc or with an integral elevated sealing surface that is dimensioned to provide precise interference with kerf surfaces for friction and heat to melt and seal the surfaces in an aesthetically desirable manner. A kerf splitter, such as a kerf splitting pin, rod or riving knife, may be provided following a saw blade with integral kerf-engaging surface to avoid disruption of the sealed surface when cut boards exit the saw blade teeth.

17 Claims, 6 Drawing Sheets

(56) References Cited

U.S. PATENT DOCUMENTS

| | | | | |
|---|---|---|---|---|
| 3,656,519 A | * | 4/1972 | Stackhouse | B27G 19/08 |
| | | | | 83/860 |
| 4,599,929 A | * | 7/1986 | Dutina | B23D 47/005 |
| | | | | 83/821 |
| 4,753,144 A | * | 6/1988 | May | B23D 47/02 |
| | | | | 83/102.1 |
| 7,055,515 B2 | | 6/2006 | Bishop | |

* cited by examiner

IN LINE EDGE-SEALING SYSTEM AND METHOD

CROSS-REFERENCE TO RELATED APPLICATIONS

The application claims the benefit of U.S. Provisional Application No. 62/630,869 filed on Feb. 15, 2018, which is incorporated herein by reference.

BACKGROUND

The cellular polyvinyl chloride (PVC) trim board market has evolved to have "sealed edges" to replace cut surfaces of the board in order to have a nice, homogeneous surface texture on all four surfaces on the trim board. Many manufacturers use a secondary process for the sealing process. For example, some equipment manufacturers have offered and sold in line sealing equipment that uses razor knives strategically located along the length of the extruded sheet to create a sealed edge. Such equipment does not reliably produce a commercially desirable sealed edge.

U.S. Pat. No. 7,055,515 to Bishop ("Bishop '515"), incorporated herein by reference, discloses a saw blade with tiers of kerf engaging elements that engage the kerf of advancing material cut by the saw blade. Each tier of engaging elements provides a different action such as shaving, sanding, scraping or burnishing the kerf of the material in a single pass to provide kerf surfaces ranging from coarse sanding to smooth burnishing.

Bishop '515 does not disclose how to apply a saw blade with kerf engaging elements to cut and seal cellular PVC. Specifically, Bishop does not appreciate or address (i) providing optimal interference between a blade kerf engaging element and a cut PVC surface to result in commercially desirable sealed surfaces and/or (ii) the problems of a kerf-engaging saw blade disrupting or erasing a burnished smooth surface of the kerf of a PVC board when a saw blade with integral sealing surface is utilized.

SUMMARY OF THE INVENTION

To answer the deficiencies of sealing equipment and methods with respect to in line cutting and sealing of PVC board, embodiments of the present invention utilize a rotary saw blade with elevated integral sealing surface or surfaces specifically dimensioned to provide advantageous interference for sealing cut PVC surfaces. In preferred embodiments, a splitter device is further provided following the blade to maintain a sealed PVC kerf surfaces in an open position to avoid disrupting or erasing the seals as the cut PVC boards exit the saw.

In one embodiment, the trim board is first cut by the teeth of the rotating blade, similar to a conventional table saw or rip saw. On the body of the blade, located some distance behind the teeth is an elevated surface, preferably machined as integral and one-piece construction of the saw blade, that extends slightly beyond the cutting width or kerf of the teeth. This geometry creates precise interference between the cut surfaces of the PVC trim board and the metal surface on the blade. Since the blade is rotating at high speed, friction between the metal surface and the PVC creates heat that melts a very thin layer of the edge of the PVC board, and the interference in geometry between metal surface and PVC compresses and smears the melted plastic into the open cells and creates a smooth, sealed surface. The relationship between the interference between the metal surface and the PVC, the speed of the blade, and the surface area of the sealing surface are all critical to achieve a commercially desirable sealed edge.

In embodiments of the invention, a splitter device, such as a kerf separating pin, riving knife rod, or the like, is added behind the saw blade to maintain separation and protect the sealed edges at the kerf so that a sealed surface is not removed by the saw blade teeth as PVC boards exit the back side, i.e. outlet, of the saw blade.

In an alternative embodiment, a separate rotary sealing disc may be provided in tandem and following a saw blade to seal cut PVC board edges. In such embodiment, the saw blade does not include an integral elevated sealing surface but the spinning sealing disc is dimensioned wider than the saw blade to provide precise interference with the kerf whereby friction and heat desirably seal the kerf surfaces of the advancing PVC board. It will be appreciated that in such embodiments that a separate kerf splitter device is not necessary where sealing occurs following the blade teeth.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

The following description is intended to convey a thorough understanding of the embodiments by providing a number of specific embodiments and details involving a method and apparatus for manufacturing a decorated extruded profile. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

Generally speaking, the various exemplary embodiments described herein relate to devices, systems and methods for sealing the edges of cut cellular polyvinyl chloride (PVC) boards. It will be appreciated that embodiments of the invention may be applicable to boards that comprise other polymer and plastic materials beyond cellular PVC.

The resultant articles may be useful in, for example, deck systems, fence systems, building products, floor coverings, or components thereof, such as planks, slats, rails, posts, flooring, siding, roofing materials, and the like. In addition, the articles may have many of the desirable properties of natural wood products, and may be sturdy, lightweight, and have excellent weatherability properties.

Figure 1:
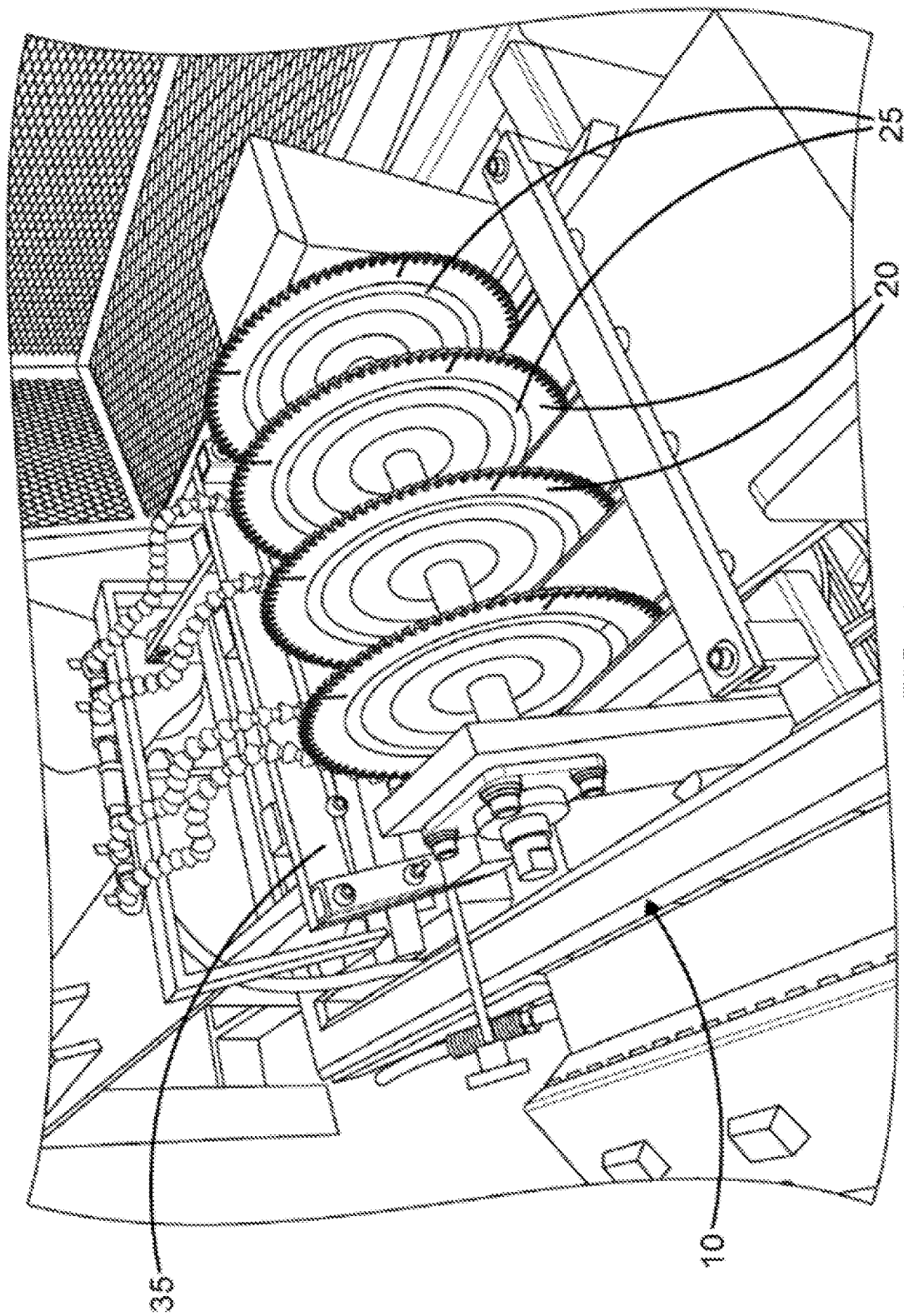
FIG. 1 is a perspective view of the inlet of an inline PVC edge-sealing apparatus including a plurality of rotary saws with kerf-engaging surfaces in a gang saw configuration followed by kerf separating pins in one embodiment of the present invention.
Figure 2:
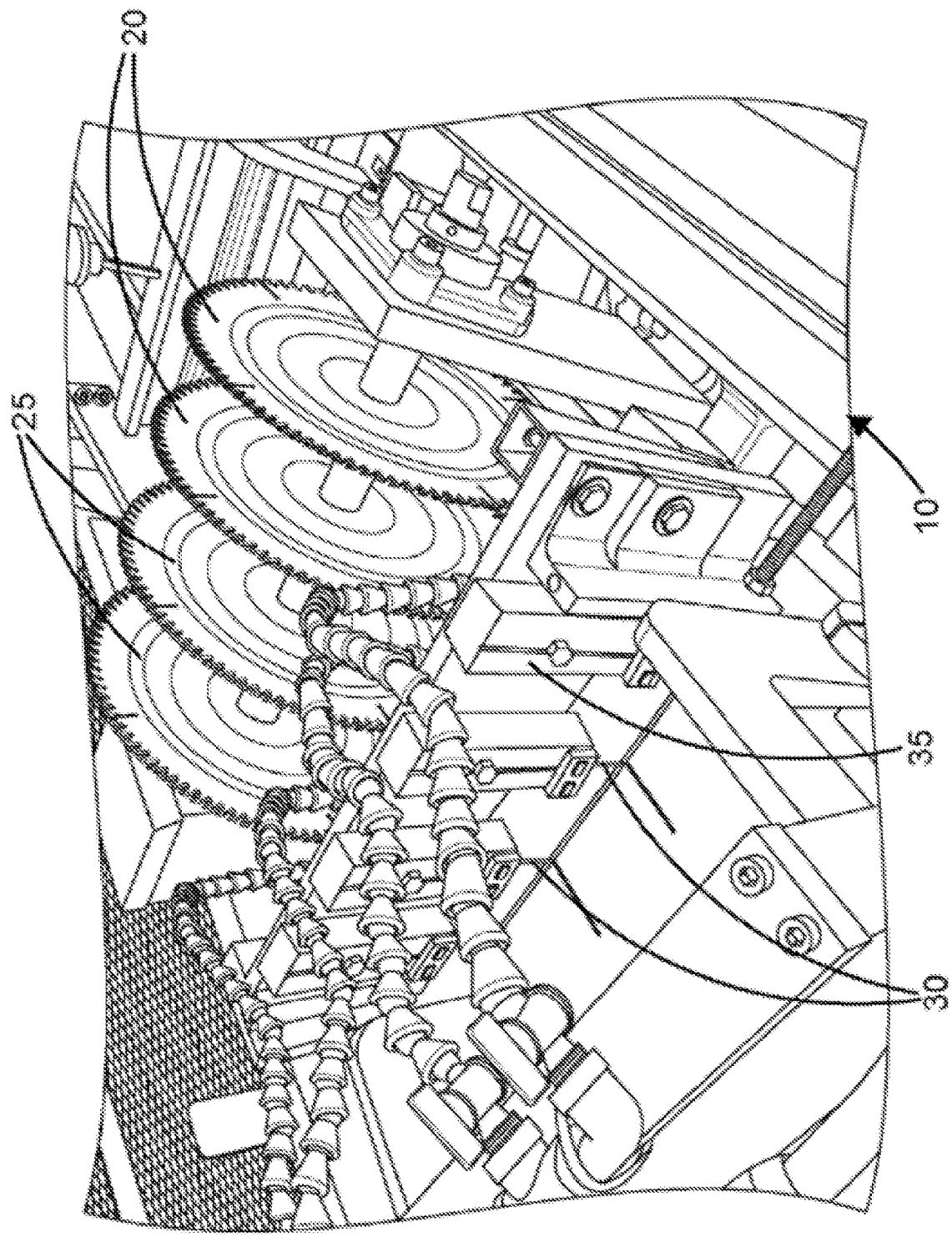
FIG. 2 is a perspective view of the outlet of an inline PVC edge-sealing apparatus including a plurality of rotary saws with kerf-engaging surfaces in a gang saw configuration followed by kerf separating pins in one embodiment of the present invention.
Figure 3:
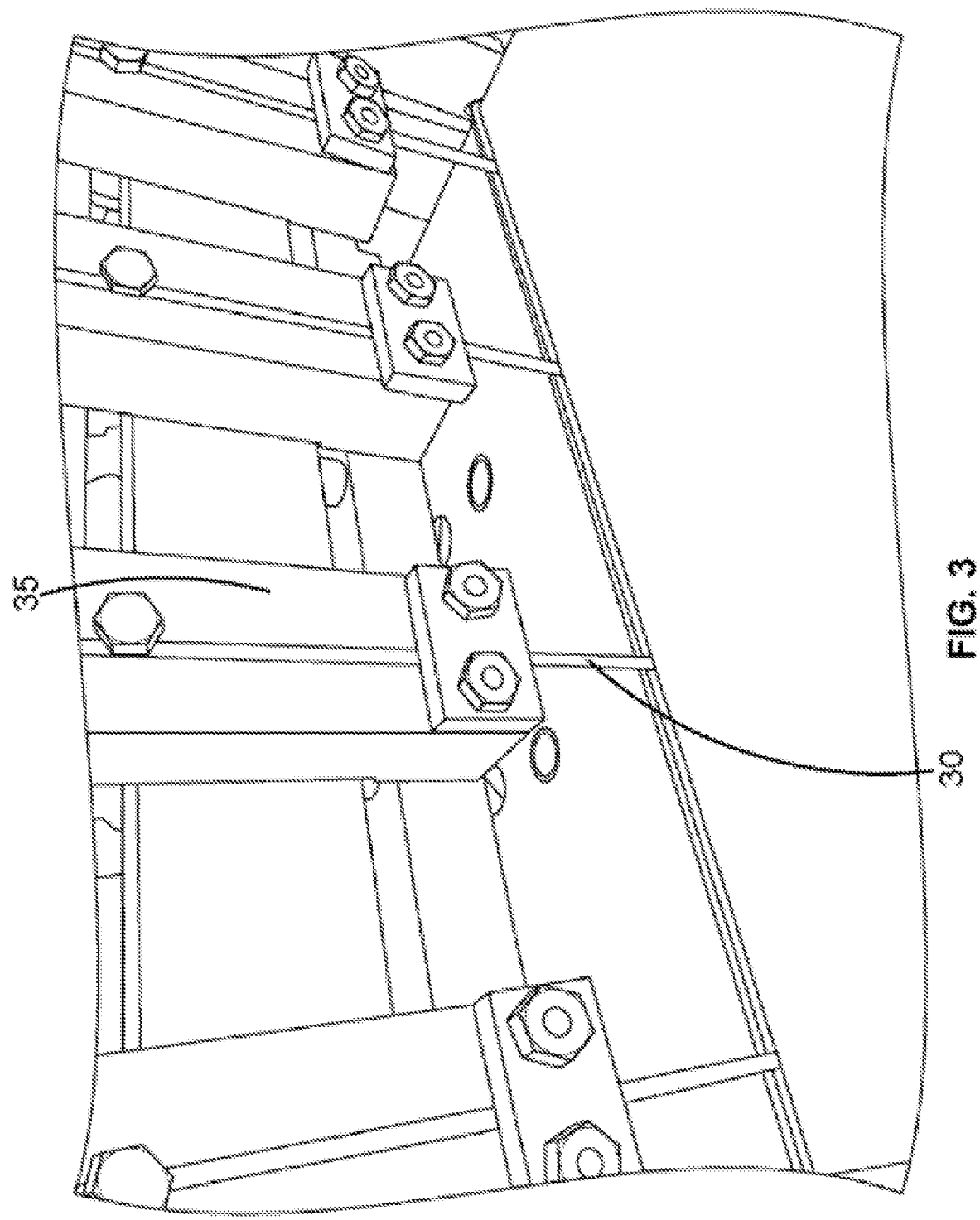
FIG. 3 is a perspective view of the of a plurality of kerf separating pins of an inline PVC edge-sealing apparatus in one embodiment of the present invention.
Figure 4:
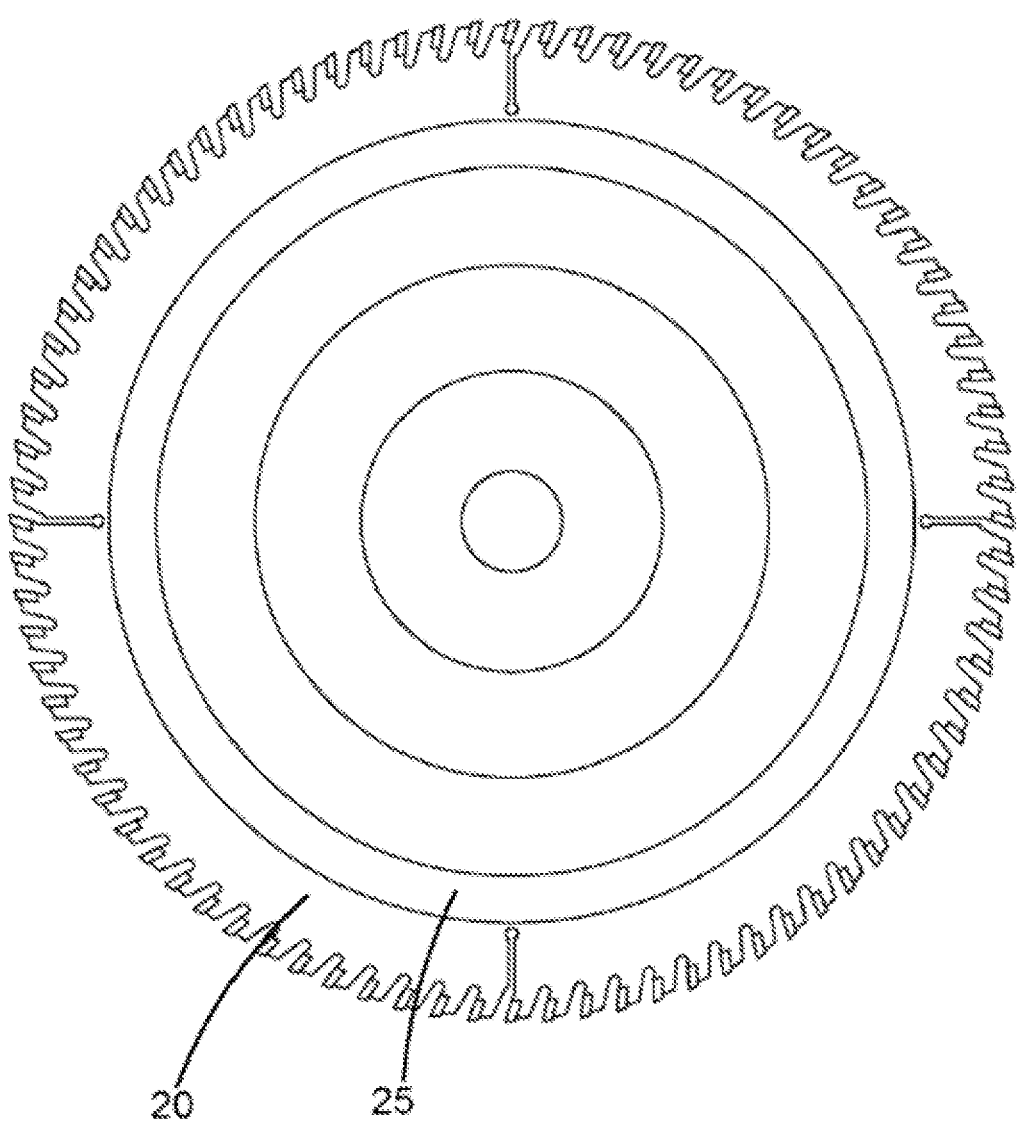
FIG. 4 is perspective view from above of a rotary saw blade including an integral elevated kerf-engaging surface.
Figure 5:
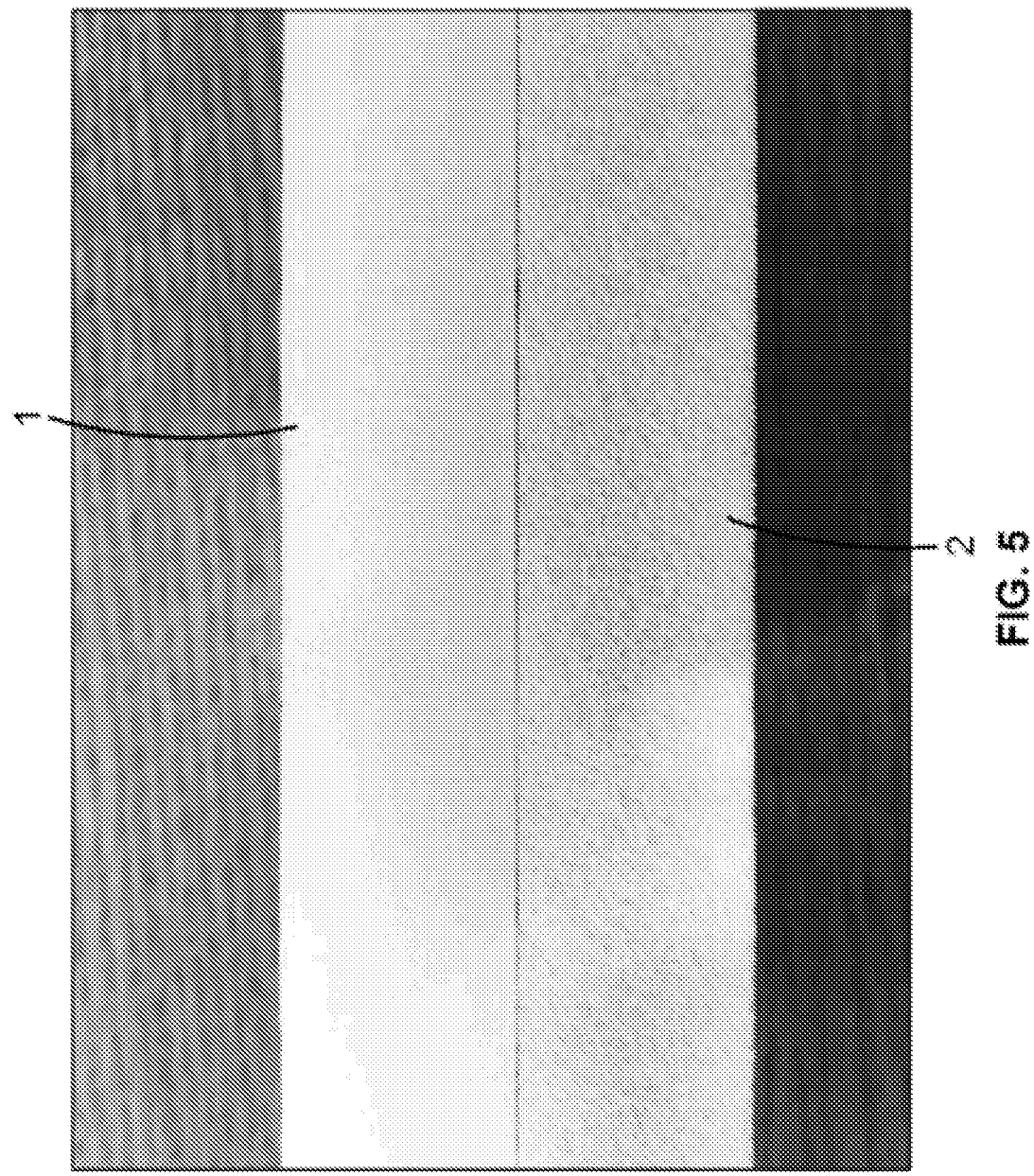
FIG. 5 is a comparison view of edges of a PVC board cut and sealed by in line sealing apparatus and process in an embodiment of the invention and a PVC board with a standard saw blade cut.

Referring to FIGS. 1-4, an embodiment of the invention includes an in line sealing system 10 for sealing cut edges of cellular PVC boards. System 10 includes a rotary saw blade 20 that receives an advancing PVC board for cutting and sealing. Preferably a plurality of rotary saw blades 20 are provided in a gang saw configuration to cut a plurality of boards as they move through system 10. In the depicted embodiment, each rotary saw blade 20 includes an integral elevated kerf-engaging surface/rim 25 that spins with the saw blade and rubs against the cut surfaces of a board kerf causing friction and heat that melts and seals the engaged cut surfaces FIG. 5 shows a comparison of a PVC board sealed cut edge 1 resulting from embodiments of the present invention versus a conventional PVC board cut edge 2 with a saw blade and no kerf-engaging sealing surface. With specific reference to FIG. 4, sealing rim 25 is preferably machined as an integral part of the saw blade 20, such as by starting with an overly thick metal plate where the sealing rim 25 is the width of the original plate thickness. The other portions of the plate forming the saw blade are machined down from that original thickness to a lesser thickness so that the blade is a single piece of metal with an elevated integral rim 25. In some embodiments multiple sealing rims with different thicknesses and/or having different coarseness may be provided as part of the rotary saw blade 25 to provide desired sanding, polishing and sealing to cut edges of PVC or polymer boards.

Behind the saw blades 20, i.e., following the outlet area of the saw blades where the boards exit the blade 20, a kerf splitting rig 35 is provided in preferred embodiments. Rig 35 supports kerf splitting devices, such as a plurality of kerf separation pins 30 (FIG. 3) that maintain separation of the kerf following cutting and sealing of a board's cut edges at the saw blade 20. It was discovered that even a small amount of contact between the blade 20 teeth and the cut and sealed surfaces of the kerf disrupted or erased the sealed surfaces. To correct the problem with erasing the sealed edge, a kerf splitting device of a separation pin 20 is positioned just downstream of the saw blade 20 to keep the kerf of the board open and positioned such to keep the board and blade from contacting one another on the exiting side of the blade 20. It will be appreciated that the kerf splitting device may include a metal rod, pin, a riving knife, and like elements, that maintain separation of the kerf. In preferred embodiments, the width of the kerf pin 30 (or other kerf separation device) is slightly wider than the width of the teeth on the blade 20 in order to spread the board open as it passes the teeth at exiting.

In preferred embodiments, to obtain a high quality edge seal of cut kerf surfaces after the material is cut, the interference, i.e. the difference between the thickness of a sealing rim and the width of the cut kerf, is from about 0.002" to about 0.006". For example, if a rim surface as measured across both sides of saw blade 20 is 0.008" larger than the kerf then this will provide 0.004" interference on each respective cut surface of the kerf (accounting for two cut surfaces and interference resulting from engagement on both opposite surfaces of the kerf). Where there is insufficient interference from the sealing surface/rim then the cut edge will not get hot enough or will not have enough pressure for the edge to be sealed. Too much interference and the material will overheat and the surface become discolored and/or the melted material resulting from the rubbing by the kerf-engagement surface will gather on the edge or corner of the surface.

The width of the sealing surface/rim also has some influence on how much interference is required. A small (less wide) rim may tolerate more interference. As the rim gets too wide then overheating becomes a problem even with small amounts of interference.

Figure 6:
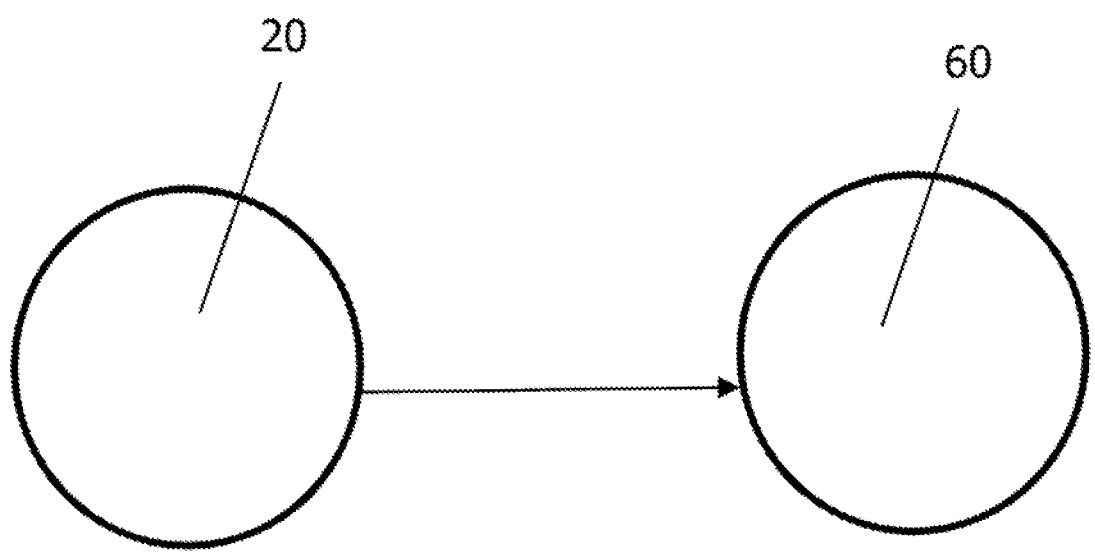
FIG. 6 is a block diagram illustrating a separate rotary sealing disc provided in tandem and following a rotary saw blade in an embodiment of the present invention.

In an alternative embodiment shown in FIG. 6, a separate rotary sealing disc 60 may be provided in tandem and following a saw blade to seal cut PVC board edges. In such embodiment, the saw blade does not include an integral elevated sealing surface but the spinning sealing disc following the blade is dimensioned wider than the saw blade to provide precise interference with the kerf cut surfaces whereby friction and heat desirably seal the kerf surfaces of the advancing PVC board. It will be appreciated that in such embodiments that a separate kerf splitter device is not necessary where sealing occurs following the blade teeth. In some embodiments, the sealing disc may include an elevated sealing rim similar to the sealing rim 25 described in the embodiment of a saw blade 20 with the integral sealing surface.

In some embodiments, it may be advantageous to heat the core of the PVC board that is being cut and sealed to a temperature of from about 120° F. to about 200° F., whereby a higher temperature will provide a better seal/finish of the cut surfaces of the kerf.

In some embodiments, testing of different rotations per minute (RPM_) of the rotary saw blade 20 with integral sealing rim 25 (with a width of 0.49") was done with different advance speeds of the PVC board being cut and sealed (FPM—feet per minute) as shown in Table 1:

TABLE 1

| Board Speed (FPM) | RPM |
| --- | --- |
| 2 | 3000 |
| 3 | 3000 |
| 4 | 3000 |
| 5 | 3000 |
| 2 | 3400 |
| 3 | 3400 |
| 4 | 3400 |
| 5 | 3400 |
| 2 | 3600 |
| 3 | 3600 |
| 4 | 3600 |
| 5 | 3600 |
| 2 | 3800 |
| 3 | 3800 |
| 4 | 3800 |
| 5 | 3800 |

The qualitative results indicated that the edge seal/finish got better as the RPMs increased at the higher speeds (about 4-5 ft/min). On most of the trials a rougher surface resulted at about 3 ft/min, and at about 2 ft/min no acceptable finish was obtained. Preferable results were obtained at about 5 ft/min and 3800 RPM. It was concluded that at about 2 ft/min the board is contacting the surface of the sealing ring for too long and adding too much frictional heat to the board. Two solutions to this issue would be in embodiments to decrease the width of the sealing ring, or slow the RPMs down to try to reach a similar result of the ratio of about 5 ft/min to about 3800 RPM.

In the preceding specification, various embodiments have been described with reference to the accompanying drawings. It will, however, be evident that various modifications and changes may be made thereto, and additional embodiments may be implemented, without departing from the broader scope of the exemplary embodiments as set forth in the claims that follow. The specification and drawings are accordingly to be regarded in an illustrative rather than restrictive sense.

What is claimed is:

1. A system for sealing a cut edge of a cellular PVC board comprising:
 a rotary saw blade; and
 a powered rotary sealing disc positioned separated from and in line with the rotary saw blade and spinning and sealing the cut edge of the PVC board by friction and heat that melts the cut edge after the PVC board is cut by the rotary saw blade, wherein the rotary sealing disc includes a kerf-engaging surface with a continuous circumference dimensioned wider than a cutting edge of the saw blade and applies from about 0.002" to about 0.006" of interference to a kerf surface of the PVC board that spins against and seals the cut edge of the PVC board after the PVC board is cut by the rotary saw blade.

2. The system of claim 1 wherein the PVC board has a core temperature from about 120° F. to about 200° F.

3. The system of claim 2, wherein the PVC board is advanced from about 4 to about 5 feet per minute and the sealing disc is spinning at a rate of from about 3000 to about 3800 rotations per minute.

4. The system of claim 3, wherein the PVC board is advanced at about 5 feet per minute and the saw blade is spinning at a rate of about 3800 rotations per minute.

5. A system for sealing a cut edge of a cellular PVC board comprising a powered rotary saw blade having an integral and elevated kerf-engaging surface with a continuous circumference dimensioned wider than a cutting edge of the saw blade and applying from about 0.002" to about 0.006" of interference to a kerf surface of the PVC board to that spins against and seals the cut edge of the PVC board with friction and heat that melts the cut edge after the PVC board is cut by the rotary saw blade.

6. The system of claim 5 wherein the PVC board has a core temperature from about 120° F. to about 200° F.

7. The system of claim 6, further comprising a kerf splitting device positioned in line and configured to engage a kerf of the PVC board after the PVC board is cut by the rotary saw blade to maintain separation of sealed kerf surfaces of the PVC board.

8. The system of claim 5, further comprising a kerf splitting device positioned in line and following the rotary saw blade to maintain separation of sealed kerf surfaces of the PVC board.

9. The system of claim 5, wherein the PVC board is advanced from about 4 to about 5 feet per minute and the saw blade is spinning at a rate of from about 3000 to about 3800 rotations per minute.

10. The system of claim 9, wherein the PVC board is advanced at about 5 feet per minute and the saw blade is spinning at a rate of about 3800 rotations per minute.

11. The system of claim 5, wherein the rotary saw blade is part of a gang saw configuration and further comprising a second rotary saw blade in the gang saw configuration wherein the second rotary saw blade includes a second elevated kerf-engaging surface with a continuous circumference dimensioned wider than a cutting edge of the second rotary saw blade configured to apply interference to a second kerf surface of the PVC board.

12. A system for sealing a cut edge of a cellular PVC board comprising:
 a powered rotary saw blade;
 a kerf-engaging surface applying interference to a kerf surface of the PVC board sufficient to seal the cut edge of the PVC board with friction and heat that melts the cut edge, wherein the kerf-engaging surface is part of the rotary saw blade, wherein the kerf-engaging surface is a sealing rim with continuous circumference dimensioned wider than a cutting edge of the saw blade and applying from about 0.002" to about 0.006" of interference to a kerf surface of the PVC board that spins against and seal the cut edge of the PVC board after the PVC board is cut by the rotary saw blade; and
 a kerf splitting device positioned in line and configured to engage a kerf of the PVC board after the PVC board is cut by the rotary saw blade to maintain separation of sealed kerf surfaces of the PVC board.

13. The system of claim 12, wherein the PVC board has a core temperature from about 120° F. to about 200° F.

14. The system of claim 13, wherein the PVC board is advanced from about 4 to about 5 feet per minute and the sealing disc is spinning at a rate of from about 3000 to about 3800 rotations per minute.

15. The system of claim 12, wherein the PVC board is advanced from about 4 to about 5 feet per minute and the sealing disc is spinning at a rate of from about 3000 to about 3800 rotations per minute.

16. The system of claim 12, wherein the rotary saw blade is part of gang saw configuration.

17. The system of claim 16, further comprising a second rotary saw blade in the gang saw configuration wherein the second rotary saw blade includes a second kerf-engaging surface configured to apply interference to a second kerf surface of the PVC board and a second kerf splitting device positioned in line and configured to engage a second kerf of the PVC board after the PVC board is cut by the second rotary saw blade to maintain separation of sealed kerf surfaces of the second kerf of the PVC board.

* * * * *